(12) United States Patent
Inoue et al.

(10) Patent No.: US 12,311,477 B2
(45) Date of Patent: *May 27, 2025

(54) WELDING JIG DEVICE AND METHOD FOR PRODUCING PART

(71) Applicant: NOK CORPORATION, Tokyo (JP)

(72) Inventors: Junpei Inoue, Kanagawa (JP); Noriyuki Goto, Kanagawa (JP); Yuichi Sakata, Kanagawa (JP); Kento Nagamatsu, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 916 days.

This patent is subject to a terminal disclaimer.

(21) Appl. No.: 17/426,790

(22) PCT Filed: Mar. 3, 2020

(86) PCT No.: PCT/JP2020/008828
§ 371 (c)(1),
(2) Date: Jul. 29, 2021

(87) PCT Pub. No.: WO2020/184276
PCT Pub. Date: Sep. 17, 2020

(65) Prior Publication Data
US 2022/0134491 A1    May 5, 2022

(30) Foreign Application Priority Data

Mar. 12, 2019  (JP) ................................. 2019-044469

(51) Int. Cl.
*B23K 37/04*    (2006.01)
*B23K 26/70*    (2014.01)

(52) U.S. Cl.
CPC .......... *B23K 37/0443* (2013.01); *B23K 26/70* (2015.10)

(58) Field of Classification Search
None
See application file for complete search history.

(56) References Cited

U.S. PATENT DOCUMENTS 5,187,345 A  *  2/1993  Alling .................... B23K 26/22
                                                       219/121.64
2004/0099642 A1    5/2004  Sonoda et al.
(Continued)

FOREIGN PATENT DOCUMENTS

CN          105081588 A       11/2015
CN          105458572 A  *     4/2016
(Continued)

OTHER PUBLICATIONS

Machine translation of CN-107900517-A, May 2024 (Year: 2024).*
(Continued)

*Primary Examiner* — Geoffrey S Evans
(74) *Attorney, Agent, or Firm* — Greenblum & Bernstein, P.L.C.

(57) ABSTRACT

A device is used for forming a part by welding a plurality of members together, and includes a jig on one side having a joint face on one side, which is adapted to contact one of faces exposed on the outer surface sides of the plurality of members overlaid one on top of the other, and an opening on one side corresponding to a portion of desired welded portions of the part; a jig on another side having a joint face on the other side, which is adapted to contact another face of the faces exposed on the outer surface sides of the plurality of members, and an opening on the other side corresponding to another portion of the desired welded portions of the part and not corresponding to the opening on one side; a laser welding machine on one side that is configured to emit a laser beam toward the opening on one side; and a laser welding machine on the other side that is
(Continued)

configured to emit a laser beam toward the opening on the other side.

3 Claims, 8 Drawing Sheets

(56) References Cited

U.S. PATENT DOCUMENTS

| | | | |
|---|---|---|---|
| 2009/0266801 A1* | 10/2009 | Oku | B23K 26/32 219/121.64 |
| 2012/0074720 A1 | 3/2012 | Johnson et al. | |
| 2013/0168360 A1 | 7/2013 | Johnson et al. | |
| 2014/0033791 A1 | 2/2014 | Johnson et al. | |
| 2015/0015007 A1 | 1/2015 | Johnson et al. | |
| 2017/0028495 A1 | 2/2017 | Jin et al. | |
| 2017/0259767 A1 | 9/2017 | Johnson et al. | |
| 2017/0282266 A1 | 10/2017 | Harrer | |
| 2020/0038981 A1 | 2/2020 | Jin et al. | |
| 2020/0139486 A1 | 5/2020 | Shimazoe et al. | |

FOREIGN PATENT DOCUMENTS

| | | | | |
|---|---|---|---|---|
| CN | 205600183 U | | 9/2016 | |
| CN | 106392231 A | | 2/2017 | |
| CN | 107900517 | | 4/2018 | |
| CN | 107900517 A | * | 4/2018 | B23K 26/21 |
| GB | 2 401 814 | | 11/2004 | |
| JP | H1-186277 A | | 7/1989 | |
| JP | 2011-161450 A | | 8/2011 | |
| JP | 2014194876 A | * | 10/2014 | |
| KR | 10-2009-0040011 A | | 4/2009 | |
| KR | 10-2013-0132419 | | 12/2013 | |
| WO | WO 2016/001992 A1 | | 1/2016 | |
| WO | 2019/017265 A1 | | 1/2019 | |

OTHER PUBLICATIONS

Machine translation of JP-2014194876-A, May 2024 (Year: 2024).*
Machine translation of CN-105458572-A, May 2024 (Year: 2024).*
Extended European Search Report in counterpart EP Patent App. No. 20769416.7, issued on Nov. 16, 2022, (in English).
Written Opinion of the International Searching Authority, WIPO, issued in PCT/JP2020/008828, dated May 19, 2020 (with English translation).
International Preliminary Report on Patentability, WIPO, issued in PCT/JP2020/008828, dated Aug. 25, 2021 (with English translation).
Office Action, China Patent Office, in counterpart Chinese Patent Application No. 202080010417.X, dated Nov. 23, 2021, English translation.
ISR for PCT/JP2020/008828, dated May 19, 2020 (w/ translation).
Office Action in the corresponding KR application No. 10-2021-7023690, dated Aug. 21, 2023 (and English translation thereof).
Office Action in the corresponding EP application No. 20769416.7, dated Nov. 6, 2023.
Korea Office Action, in counterpart Korean Application No. 10-2021-7023690, dated Feb. 14, 2023, with English translation.

* cited by examiner

WELDING JIG DEVICE AND METHOD FOR PRODUCING PART

CROSS REFERENCE TO RELATED APPLICATIONS

This is the National Stage of International Application No. PCT/JP2020/008828, filed Mar. 3, 2020, which claims the benefit of Japanese Patent Application No. 2019-044469 filed Mar. 12, 2019, the disclosures of which are herein expressly incorporated by reference in their entirety.

TECHNICAL FIELD

The present disclosure relates to a welding jig device and a method for producing a part.

BACKGROUND ART

Conventionally, there is known a part formed by joining a plurality of plate-like metal members by welding (hereinafter also simply referred to as a "part"), such as a fuel cell that is a part for a fuel cell device. For a part such as a fuel cell, not only the members to be joined, but also a circulation path for a reactant gas within the part is formed by welding. The circulation path is formed in a closed circuit form by welding around through-holes that are provided in the members so that airtightness is secured.

As a technique for forming a part, which has a closed circuit formed therein, by welding a plurality of metal members together as described above, there is known a welding jig device or a method for producing fuel cell-related parts, for example (see Patent Literatures 1; Japanese Patent Application Publication No. 2014-194876 and Patent Literature 2: Japanese Patent Application Publication No. 2011-161450, for example). Patent Literatures 1 and 2 each disclose a welding jig device with openings that are provided corresponding to the portions to be welded, for specifying the portions to be welded.

Summary of Disclosure

Technical Problem

By the way, a welded part may have welded portions with a complex shape, such as welded portions forming an annular closed path or welded portions located in proximity to each other, for example.

A jig for welding annular portions to be welded together should have an opening corresponding to the portions to be welded, and thus inevitably includes two separate jigs on the inner side and outer side of the annular portions.

When the portions to be welded are located in proximity to each other, the dimensions of a jig attached between them should be small, resulting in a lower strength of the jig. Consequently, holding of the to-be-welded part around the portions to be welded with the jig has been insufficient. Further, when the portions to be welded are located in extreme proximity to each other, it may be impossible to dispose a jig between them. In such a case, holding of the to-be-welded part around the portions to be welded has become further insufficient.

When the portions to be welded have a complex shape as described above, in order to securely hold the to-be-welded part around the portions to be welded that are located in proximity to each other, and adequately specify the portions to be welded, a conventional welding jig device includes a jig for the entire members, which is configured to fix the entire members and has an opening corresponding to a portion of the portions to be welded, and another jig for some of the members, which is configured to be detachable from the jig for the entire members and corresponds to another portion of the portions to be welded, for example. However, in a welding operation performed with such a conventional welding jig device, welding of the portions to be welded with a complex shape involves both the operation of fixing the jig for the entire members and the operation of fixing the jig for some of the members. In addition, in a welding operation performed with the conventional welding jig device, to weld the aforementioned portions to be welded with a complex shape together, it has been sometimes necessary to replace or move the jig for some of the members corresponding to the portions to be welded. Further, in the conventional welding jig device and the conventional method for producing a part, when the jig for some of the members is attached or detached to perform a welding operation for forming a part, the resulting part sometimes has strain generated therein due to the welding. As described above, the conventional welding jig device and the method for producing a part using the conventional welding jig device involve a large number of steps regarding the operation of fixing the jigs for a welding operation.

The present disclosure has been made in view of the foregoing problems, and it is an object of the present disclosure to provide a welding jig device and a method for producing a part that can facilitate a welding operation.

Solution to Problem

To achieve the aforementioned object, a welding jig device according to the present disclosure is used for forming a part by welding a plurality of members together, and includes a jig on one side including a joint face on the one side and an opening on the one side, the joint face on the one side being adapted to contact one of faces exposed on outer surface sides of the plurality of members that are overlaid one on top of the other, the opening on the one side corresponding to a portion of desired welded portions of the part; a jig on another side including a joint face on the other side and an opening on the other side, the joint face on the other side being adapted to contact another face of the faces exposed on the outer surface sides of the plurality of members, the opening on the other side corresponding to another portion the desired welded portions of the part and not corresponding to the opening on the one side; a laser welding machine on the one side that is configured to emit a laser beam toward the opening on the one side; and a laser welding machine on the other side that is configured to emit a laser beam toward the opening on the other side.

In the welding jig device according to an aspect of the present disclosure, the laser welding machine on the one side is provided on an outer side of a lateral face on the one side, the lateral face on the one side being opposite to the joint face on the one side, and the laser welding machine on the other side is provided on an outer side of a lateral face on the other side, the lateral face on the other side being opposite to the joint face on the other side.

In the welding jig device according to an aspect of the present disclosure, the desired welded portions that are formed through the opening on the one side and the opening on the other side form annular closed paths.

To achieve the aforementioned object, a method for producing a part according to the present disclosure is a method for producing a part by overlaying a plurality of members one on top of the other and welding the members together, including a step of overlaying the plurality of members one on top of the other and holding the members with a jig on one side and a jig on another side, the jig on the one side including a joint face on the one side and an opening on the one side, the joint face on the one side being adapted to contact one of faces exposed on outer surface sides of the plurality of members overlaid one on top of the other, the opening on the one side corresponding to a portion of desired welded portions of the part, the jig on the other side including a joint face on the other side and an opening on the other side, the joint face on the other side being adapted to contact another face of the faces exposed on the outer surface sides of the plurality of members, the opening on the other side corresponding to another portion of the desired welded portions of the part and not corresponding to the opening on the one side; and a step of welding the plurality of members together through the opening on the one side and the opening on the other side, in which the step of welding the plurality of members together through the opening on the one side and the opening on the other side includes emitting a laser beam from a laser welding machine on the one side toward the opening on the one side, and emitting a laser beam from a laser welding machine on the other side toward the opening on the other side, the laser welding machine on the one side being provided on an outer side of the lateral face on the one side, the laser welding machine on the other side being provided on an outer side of the lateral face on the other side.

In the method for producing a part according to an aspect of the present disclosure, the desired welded portions that are formed through the opening on the one side and the opening on the other side form annular closed paths.

Effects of Disclosure

The welding jig device and the method for producing a part according to the present disclosure can facilitate a welding operation.

DESCRIPTION OF EMBODIMENTS

Hereinafter, an embodiment of the present disclosure will be described with reference to the drawings. The following embodiment will describe an example in which a welding jig device according to the present disclosure is used for a method for producing a fuel cell as an example of a part produced by overlaying a plurality of metal members one on top of the other and joining them.

[Welding Jig Device]

First, an embodiment of a welding jig device of the present disclosure will be described.

Figure 1:
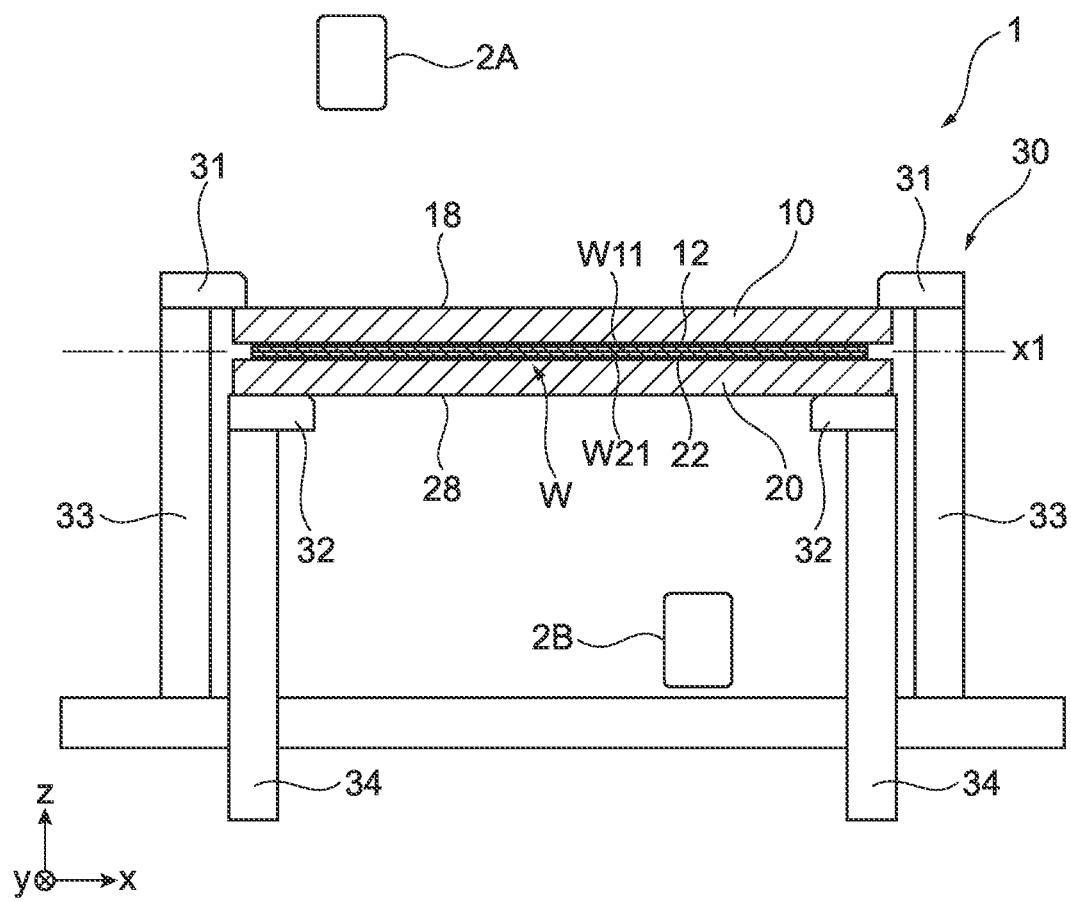
FIG. 1 A front view for illustrating the schematic configuration of a welding jig device according to an embodiment of the present disclosure.
Figure 2:
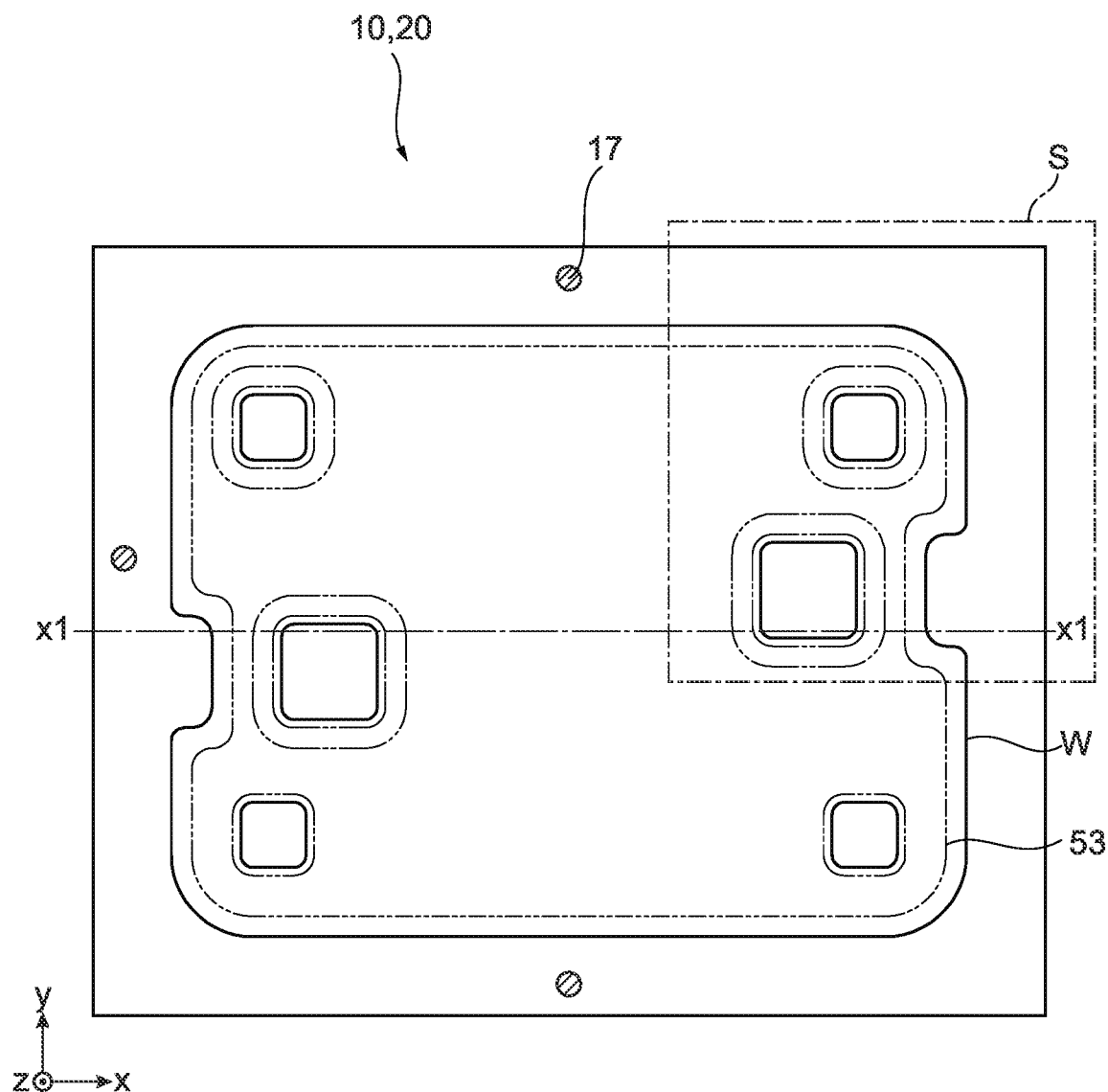
FIG. 2 A schematic diagram for illustrating the schematic configuration of a jig on one side and a jig on another side of the welding jig device illustrated in FIG. 1.
Figure 3:
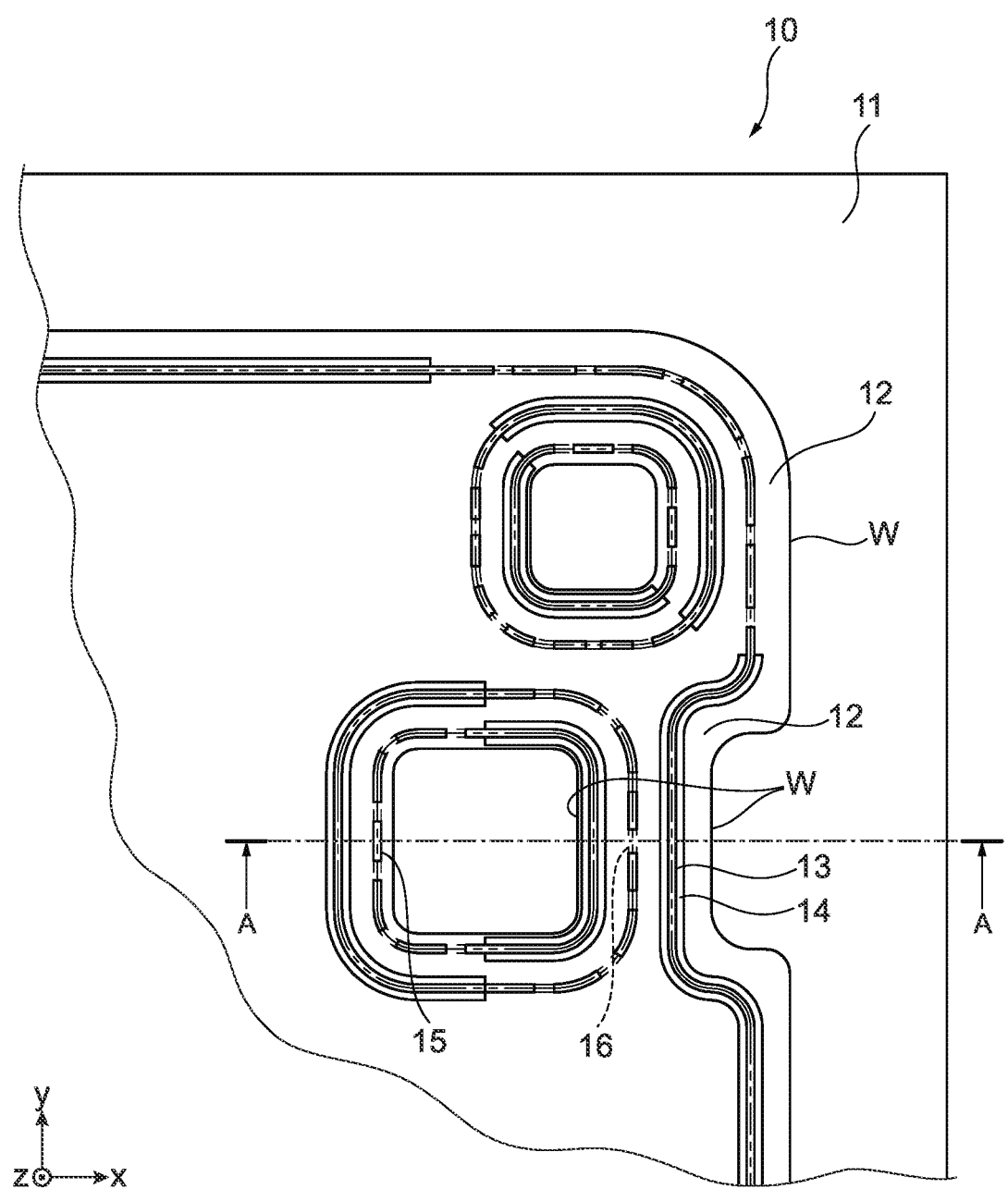
FIG. 3 A partial schematic diagram of the jig on one side of the welding jig device illustrated in FIG. 2.
Figure 4:
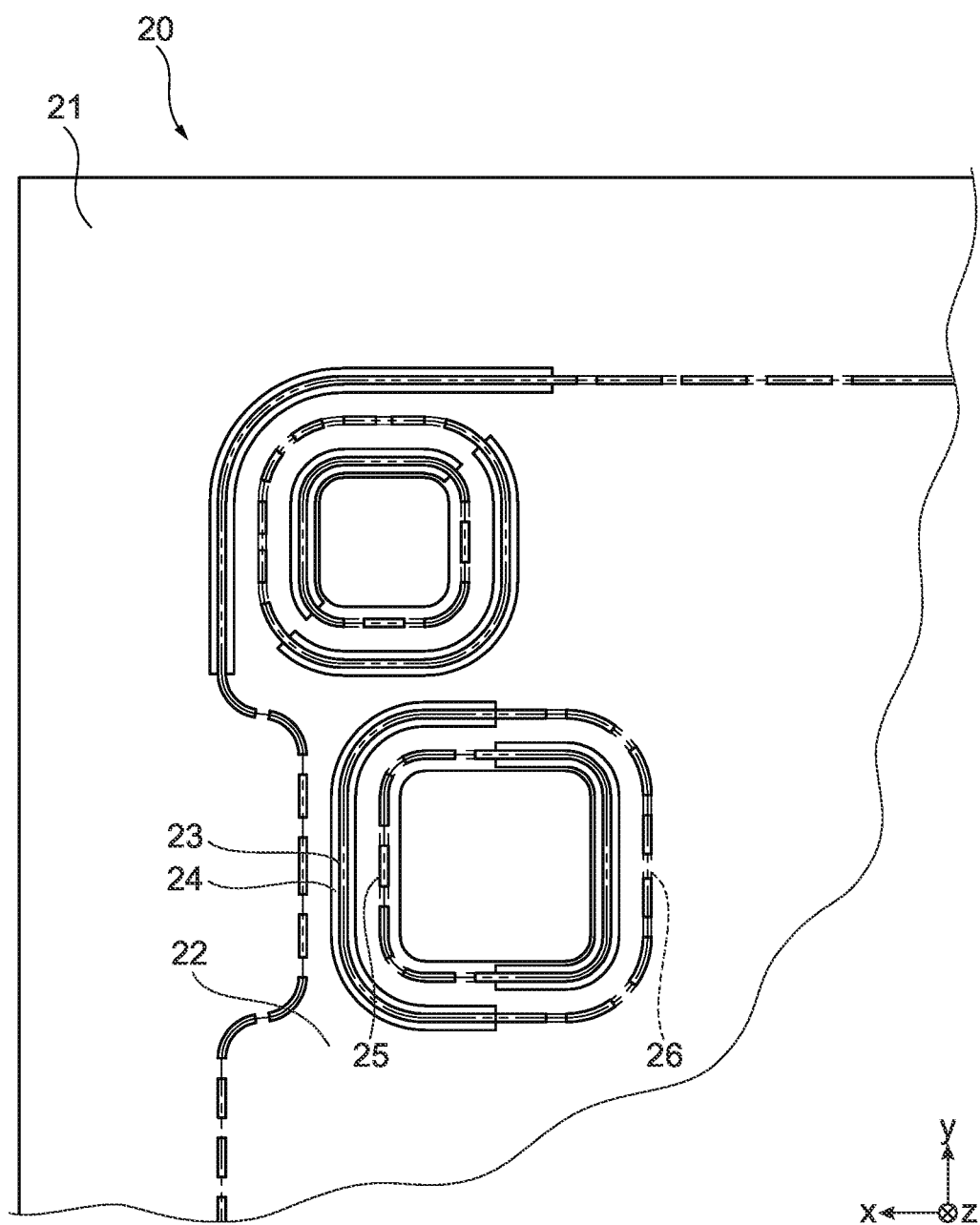
FIG. 4 A partial schematic diagram of the jig on the other side of the welding jig device illustrated in FIG. 2.
Figure 5:
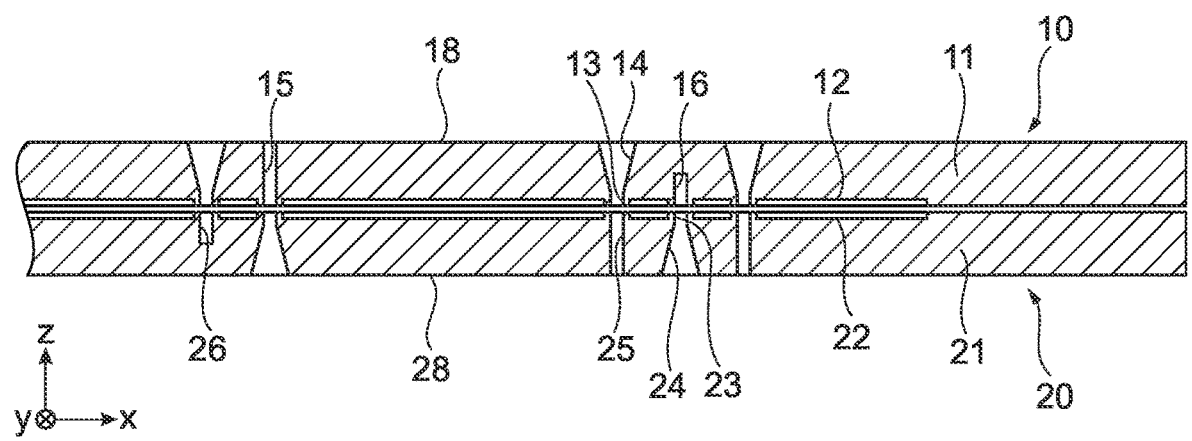
FIG. 5 An A-A cross-sectional view of the jig on one side and the jig on the other side of the welding jig device illustrated in FIG. 2.
Figure 6:
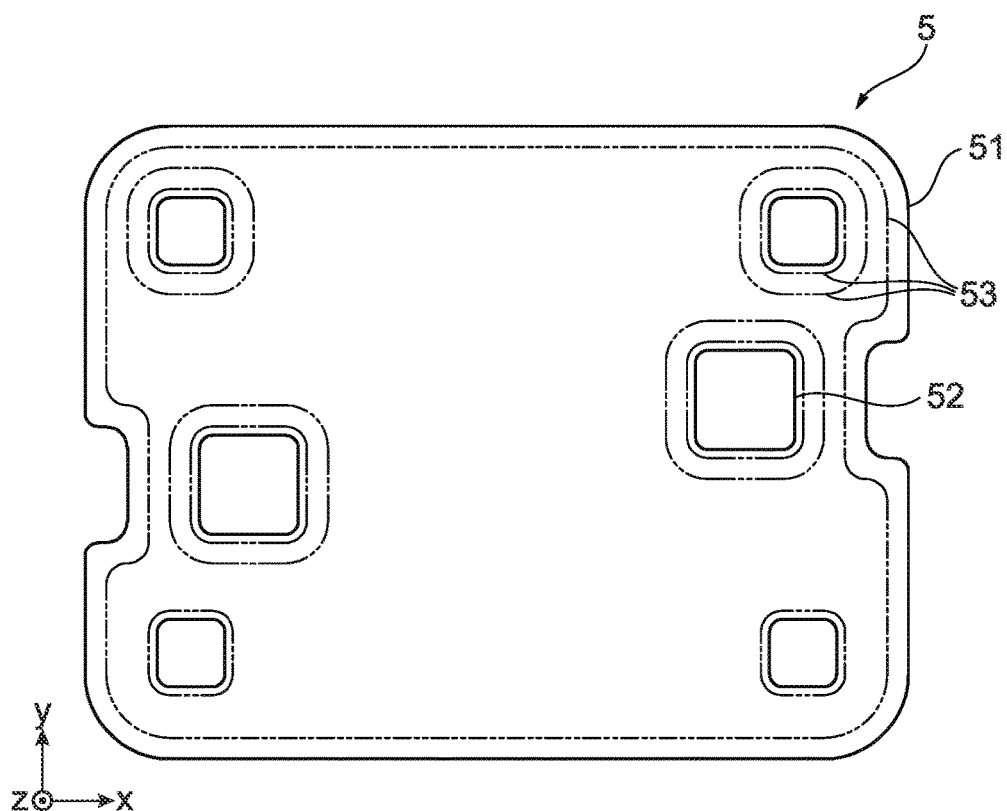
FIG. 6 A plan view for illustrating the schematic configuration of a part produced with the welding jig device illustrated in FIG. 1.

FIG. 1 is a front view for illustrating the schematic configuration of a welding jig device 1 according to an embodiment of the present invention. FIG. 2 is a plan view for illustrating the schematic configuration of a jig 10 on one side and a jig 20 on another side of the welding jig device 1. FIG. 3 is a partial plan view of the jig 10 on one side of the welding jig device 1. FIG. 4 is a partial bottom view of the jig 20 on the other side of the welding jig device 1. FIG. 5 is an A-A cross-sectional view of the jig 10 on one side and the jig 20 on the other side of the welding jig device 1. FIG. 6 is a plan view for illustrating the schematic configuration of a part 5 produced with the welding jig device 1.

As illustrated in FIGS. 1 to 6, the welding jig device 1 according to an embodiment of the present disclosure is used for forming a part 5 by welding a plurality of members W together, and includes the jig 10 on one side that has a joint face 12 on one side to be in contact with one face W11 out of faces exposed on the outer surface sides of the plurality of members W that are overlaid one on top of the other, and also has an opening 13 on one side corresponding to a portion of desired welded portions 53 of the part 5; the jig 20 on the other side that has a joint face 22 on the other side to be in contact with another face W21 of the faces exposed on the outer surface sides of the plurality of members W, and also has an opening 23 on the other side corresponding to another portion of the desired welded portions 53 of the part 5 and not corresponding to the opening 13 on one side; a laser welding machine 2A on one side that is provided on the outer side of a lateral face 18 on one side and emits a laser beam toward the opening 13 on one side; and a laser welding machine 2B on the other side that is provided on the outer side of a lateral face 28 on the other side and emits a laser beam toward the opening 23 on the other side. Hereinafter, the structure of the welding jig device 1 will be specifically described.

Hereinafter, a direction parallel with the direction of the axis x1, which lies along the faces of the jig 10 on one side and the jig 20 on the other side of the welding jig device 1 illustrated in FIGS. 1 to 6 (hereinafter also referred to as an "axis direction"), is assumed as the "x-axis direction" for convenience sake. The x-axis direction is also referred to as the right-left direction. In addition, one of directions (i.e., y-axis direction) perpendicular to the axis x1 of the welding jig device 1 in FIGS. 1 to 6 is assumed as the front-rear direction. Further, the other direction (i.e., z-axis direction) of the directions perpendicular to the axis x1 of the welding jig device 1 in FIGS. 1 to 6 is assumed as the vertical direction. In the following description, the positional relationship or direction of each component expressed as the "right side," "left side," "front side," rear side," "upper side," or "lower side" only illustrates the positional relationship or direction on the drawings, and does not limit the positional relationship or direction in the actual welding jig device.

As illustrated in FIG. 1, the welding jig device 1 is used for producing the part 5 by joining a plurality of metal members W by welding. As illustrated in FIG. 6, the part 5 produced by joining the members W using the welding jig device 1 includes a part body 51, which has been obtained by joining the members W illustrated in FIG. 1 and the like, and an opening 52 penetrating the part body 51 in its thickness direction. The part 5 also includes the welded portions 53 that are the portions of the plurality of members W joined by welding. The welded portions 53 form annular closed paths, for example.

The laser welding machine 2A on one side and the laser welding machine 2B on the other side irradiate members (i.e., workpieces) that are the targets to be joined, such as the members W, with laser beams, thereby joining the members. The laser welding machine 2A on one side and the laser welding machine 2B on the other side each include a YAG laser source that uses YAG (Yttrium Aluminum Garnet) as a medium. The laser welding machine 2A on one side and the laser welding machine 2B on the other side each emit a laser beam with an output of about 500 W and a wavelength of about 1070 nm (i.e., infrared region), for example, toward the members W. The laser welding machine 2A on one side and the laser welding machine 2B on the other side each include a laser reflecting mirror, such as a galvanometer mirror (not illustrated), as a scanning optical component for scanning the surfaces of the members W with a laser beam. The scanning range of the galvanometer mirror of each of the laser welding machine 2A on one side and the laser welding machine 2B on the other side is a range of 180 mm×180 mm square on the xy plane, for example. The laser welding machine 2A on one side and the laser welding machine 2B on the other side are each configured to be movable on the xy plane along the faces of the members W by means of a drive mechanism (not illustrated) so as to be capable of irradiating the entire members W with a laser beam.

It should be noted that the configuration of each of the laser welding machine 2A on one side and the laser welding machine 2B on the other side is not limited to that of the laser welding machine 2 described above, and can be used for methods for producing parts by welding using various welding machines. For example, the welding machine may be a carbon dioxide laser welding machine.

The welding jig device 1 includes the jig 10 on one side and the jig 20 on the other side as described above, and also includes a jig mount portion 30. The jig 10 on one side and the jig 20 on the other side are formed of metal or resin with excellent durability and heat resistance against infrared laser beams. As illustrated in FIG. 1, the jig 10 on one side and the jig 20 on the other side are joined such that the joint face 12 on one side and the joint face 22 on the other side face each other, and are disposed across the jig mount portion 30. The jig 10 on one side and the jig 20 on the other side in the usage state hold the plurality of members W, which are overlaid one on top of the other, as the targets to be welded together, between the joint face 12 on one side and the joint face 22 on the other side. In FIG. 2, the position of the virtual outline of the members W, which are held between the jig 10 on one side and the jig 20 on the other side, is indicated by the solid line. In addition, in FIG. 2, the portions 53 to be welded of the members W are indicated by the dashed and double-dotted lines. The jig 10 on one side and the jig 20 on the other side in the usage state are provided with positioning pins 17 for engaging the jig 10 on one side with the jig 20 on the other side so as to prevent positional deviations thereof in the right-left direction and the front-rear direction.

Next, the specific structures of the jig 10 on one side and the jig 20 on the other side will be described with reference to FIGS. 3 to 5. FIG. 3 illustrates a state in which a region S of a portion of the jig 10 on one side indicated by the dashed and single-dotted line in FIG. 2 is seen from above. FIG. 4 illustrates a state in which the region S of the jig 20 on the other side is seen from below. FIG. 5 is a cross-sectional view of the region S seen from the front side in a state in which the jig 10 on one side and the jig 20 on the other side are joined.

As illustrated in FIGS. 3 and 5, the jig 10 on one side has a shape that can cover portions other than the portions 53 to be welded of the plate-like members W, together with the jig 20 on the other side. The jig 10 on one side includes a jig body 11, the joint face 12 on one side, the opening 13 on one side, an inclined plane 14 of the opening, a transmissive hole portion 15, and a transmissive portion 16.

The jig body 11 determines the approximate shape of the jig 10 on one side. The jig body 11 has an approximately plate-like shape corresponding to the shapes of the members W to be welded using the jig 10 on one side. The joint face 12 on one side is formed on the jig body 11 so as to be capable of contacting the face W11 exposed on an outer surface side of the members W. The joint face 12 on one side is formed on the jig body 11 so as to be capable of facing the jig 20 on the other side. The joint face 12 on one side has an irregular shape corresponding to the shapes of the members W, for example.

The opening 13 on one side is an elongated hole penetrating the jig body 11 in its thickness direction, that is, a region between the joint face 12 on one side (i.e., inner side) and its opposite lateral face 18 on one side (i.e., outer side). The opening 13 on one side is provided corresponding to a portion of the desired welded portions 53 of the part 5 that is to be produced by allowing the welding jig device 1 to hold the members W. The opening 13 on one side is open with its diameter increasing toward the lateral face 18 on one side. In the jig body 11, the inclined plane 14 of the opening is provided around the opening 13 on one side. The inclined plane 14 of the opening is formed along a cross-section of the jig body 11 in its thickness direction as a plane with a predetermined inclination angle with respect to the z-axis. The slope of the inclined plane 14 of the opening is provided to allow a laser beam emitted from the laser welding machine 2A on one side to easily become incident on the members W via the opening 13 on one side.

The transmissive hole portion 15 and the transmissive portion 16 are provided in the jig body 11 at positions where the opening 13 on one side is not provided. That is, the transmissive hole portion 15 and the transmissive portion 16 are provided corresponding to the position of the opening 23 on the other side of the jig 20 on the other side described below among the desired welded portions 53 of a fuel cell that is to be produced by allowing the welding jig device 1 to hold the members W. The transmissive hole portion 15 is an elongated hole penetrating a region between the joint face 12 on one side (i.e., inner side) and its opposite lateral face 18 on one side (i.e., outer side) in the thickness direction of the jig body 11. The transmissive portion 16 is a groove-like elongated hole with a predetermined depth from the joint face 12 on one side (i.e., inner side) to the lateral face 18 on one side along the thickness direction of the jig body 11. The transmissive hole portion 15 and the transmissive portion 16 are provided in appropriate places of the jig body 11 where the opening 13 on one side is not provided such that the transmissive hole portions 15 and the transmissive portions 16 are alternately provided. That is, as long as the transmissive hole portion 15 and the transmissive portion 16 are provided in the jig body 11 at positions where the opening 13 on one side is not provided, the positions of the transmissive hole portion 15 and the transmissive portion 16 are not limited to particular positions, nor is the area ratio between the transmissive hole portion 15 and the transmissive portion 16 limited to a particular ratio, for example. It is also possible to provide only one of the transmissive hole portion 15 or the transmissive portion 16 in the jig 10 on one side.

Next, as illustrated in FIGS. 4 and 5, the jig 20 on the other side has a shape capable of covering portions other than the portions 53 to be welded of the plate-like members W, together with the jig 10 on one side. The jig 20 on the other side includes a jig body 21, the joint face 22 on the other side, the opening 23 on the other side, an inclined plane 24 of the opening, a transmissive hole portion 25, and a transmissive portion 26.

The jig body 21 determines the approximate shape of the jig 20 on the other side. As with the jig body 11, the jig body 21 has an approximately plate-like shape corresponding to the shapes of the members W to be welded using the jig 20 on the other side. The joint face 22 on the other side is formed on the jig body 11-21 so as to be capable of contacting the face W21 exposed on an outer surface side of the members W. The joint face 22 on the other side is formed on the jig body 11-21 so as to be capable of facing the jig 10 on one side. The jig 20 on the other side has an irregular shape corresponding to the shapes of the members W, for example.

The opening 23 on the other side is an elongated hole penetrating the jig body 21 in its thickness direction, that is, a region between the joint face 22 on the other side (i.e., inner side) and its opposite lateral face 28 on the other side (i.e., outer side). The opening 23 on the other side is provided corresponding to a portion (which is different from the opening 13 on one side of the jig 10 on one side) of the desired welded portions 53 of the part 5 that is to be produced by allowing the welding jig device 1 to hold the member W. That is, the opening 23 on the other side is provided corresponding to the positions where the transmissive hole portion 15 and the transmissive portion 16 of the jig 10 on one side are provided among the desired welded portions 53 of a fuel cell that is to be produced by allowing the welding jig device 1 to hold the members W. The opening 23 on the other side is open with its diameter increasing toward the lateral face 28 on the other side. In the jig body 21, the inclined plane 24 of the opening is provided around the opening 23 on the other side. The inclined plane 24 of the opening is formed along a cross-section of the jig body 21 in its thickness direction as a plane with a predetermined inclination angle with respect to the z-axis. The slope of the inclined plane 24 of the opening is provided to allow a laser beam emitted from the laser welding machine 2B on the other side to easily become incident on the members W via the opening 23 on the other side.

In the welding jig device 1, openings corresponding to the entire welded portions 53 of the part 5 are formed by the opening 13 on one side of the jig 10 on one side and the opening 23 on the other side of the jig 20 on the other side. Specifically, as illustrated in FIG. 6, for example, to form each annular welded portion 53, each of the opening 13 on one side and the opening 23 on the other side is formed such that it has half the perimeter of the annular welded portion 53 as illustrated in FIGS. 3 and 4. Performing welding through the opening 13 on one side and the opening 23 on the other side using the laser welding machines 2 allows the portions 53 to be welded, which have a complex shape such as an annular shape, to be appropriately welded to form the part 5.

The transmissive hole portion 25 and the transmissive portion 26 are provided in the jig body 21 at positions where the opening 23 on the other side is not provided. That is, the transmissive hole portion 25 and the transmissive portion 26 are provided corresponding to the position of the opening 13 on one side of the jig 10 on one side among the desired welded portions 53 of the part 5 that is to be produced by allowing the welding jig device 1 to hold the members W. The transmissive hole portion 25 is an elongated hole penetrating a region between the joint face 22 on the other side (i.e., inner side) and its opposite lateral face 28 on the other side (i.e., outer side) in the thickness direction of the jig body 21. The transmissive portion 26 is a groove-like elongated hole with a predetermined depth from the joint face 22 on the other side (i.e., inner side) to the lateral face 28 on the other side along the thickness direction of the jig body 21. The transmissive hole portion 25 and the transmissive portion 26 are provided in appropriate places of the jig body 21 where the opening 23 on the other side is not provided such that the transmissive hole portions 25 and the transmissive portions 26 are alternately provided. That is, as long as the transmissive hole portion 25 and the transmissive portion 26 are provided in the jig body 21 at positions where the opening 23 on the other side is not provided, the positions of the transmissive hole portion 25 and the transmissive portion 26 are not limited to particular positions, nor is the area ratio between the transmissive hole portion 25 and the transmissive portion 26 limited to a particular ratio, for example. It is also possible to provide only one of the transmissive hole portion 25 or the transmissive portion 26 in the jig 20 on the other side.

Next, the configuration of the jig mount portion 30 of the welding jig device 1 will be described. The jig mount portion 30 includes support portions 31 on one side, support portions 32 on the other side, columns 33 on one side, columns 34 on the other side, and a support base 35.

The support portions 31 on one side are provided on one side across the axis x1. The support portions 31 on one side are provided in pairs around one end (i.e., the left side in FIG. 1) and another end (i.e., the right side in FIG. 1) of the jig 10 on one side. The support portions 32 on the other side are provided on the other side of the support portions 31 on one side across the axis x1. The support portions 32 on the other side are provided in pairs around one end (i.e., the left side in FIG. 1) and another end (i.e., the right side in FIG. 1) of the jig 20 on the other side. The support portions 31 on one side and the support portions 32 on the other side are provided so as to face each other across the axis x1.

The support portions 31 on one side contact the lateral face 18 on one side of the jig 10 on one side, thus supporting the jig 10 on one side. Meanwhile, the support portions 32 on the other side contact the lateral face 28 on the other side of the jig 20 on the other side, thus supporting the jig 20 on the other side. The jig 10 on one side and the jig 20 on the other side each exert a fastening force acting in the direction of the axis x1 like a clamp, for example. With the fastening force, the support portions 31 on one side and the support portions 32 on the other side support the jig 10 on one side and the jig 20 on the other side in a state in which the jig 10 on one side and the jig 20 on the other side are joined.

The columns 33 on one side are provided at opposite ends of the welding jig device 1 in the right-left direction. Each column 33 on one side has one end disposed on the support base 35, and has another end supporting the corresponding support portion 31 on one side. The jig 10 on one side is supported by the support portions 31 on one side, the columns 33 on one side, and the support base 35. The columns 34 on the other side are provided at opposite ends of the welding jig device 1 in the right-left direction. Each column 34 on the other side has one end in contact with the installation plane, and has another end supporting the corresponding support portion 32 on the other side. The jig 20 on the other side is supported by the support portions 32 on the other side and the columns 34 on the other side.

[Method for Producing a Part Using the Welding Jig Device]

Described next is an embodiment of a method for producing a part of the present disclosure that is executed with the welding jig device 1 with the aforementioned configuration.

Figure 7:
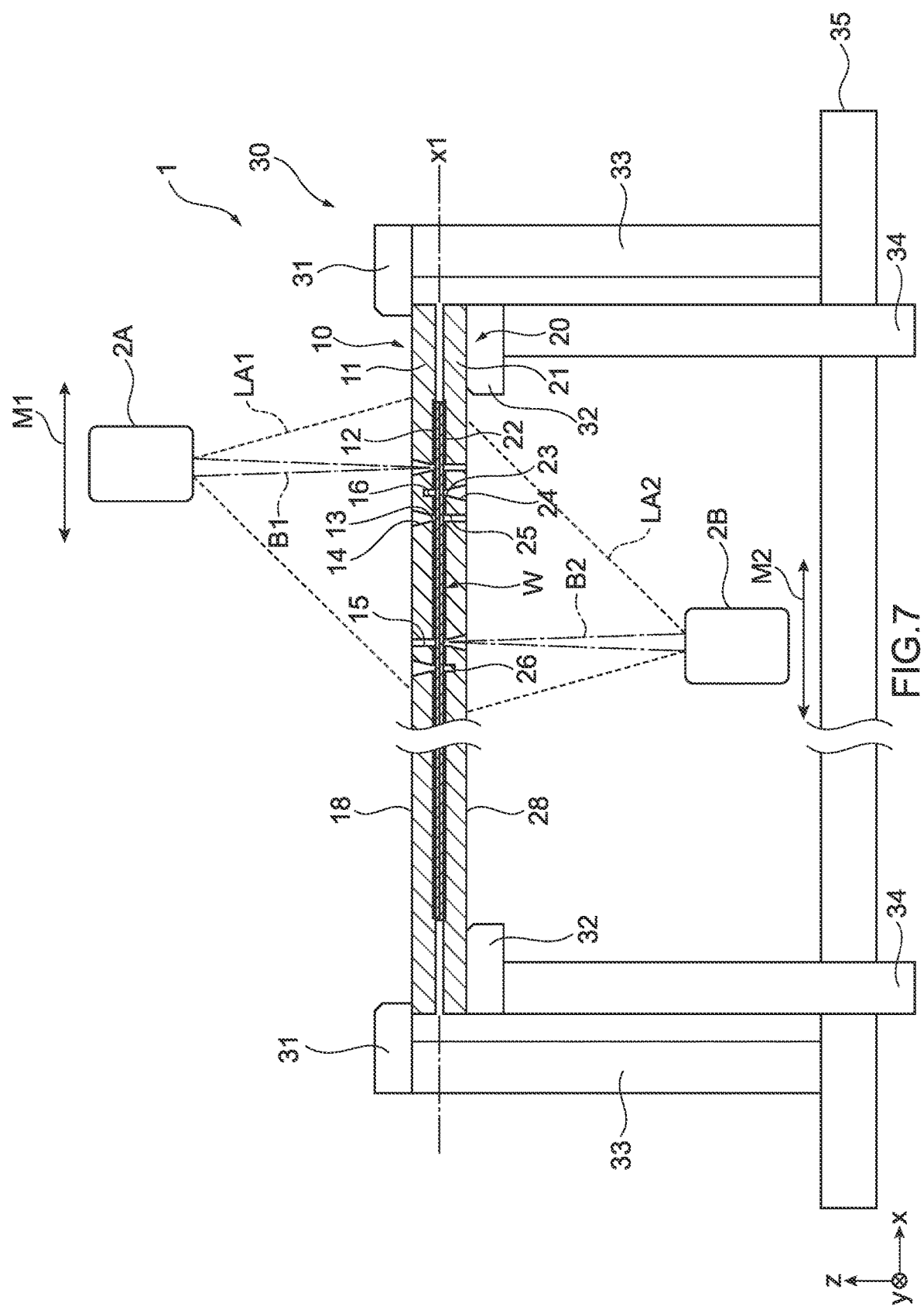
FIG. 7 A schematic diagram for illustrating a step of welding members together through both an opening on one side and an opening on the other side in a method for producing a part according to an embodiment of the present disclosure.

FIG. 7 is a schematic diagram for illustrating a step of welding the members W together through both the opening 13 on one side and the opening 23 on the other side in a method for producing a part according to an embodiment of the present disclosure. As illustrated in FIG. 7, in the method for producing the part 5 by overlaying the plurality of members W one on top of the other and welding them together, the following steps are executed: a step of overlaying the plurality of members W one on top of the other and holding them with the jig 10 on one side and the jig 20 on the other side of the welding jig device 1 (hereinafter referred to as "step 1"), and a step of welding the plurality of members W together with a laser beam B1 that has been emitted from the laser welding machine 2A on one side and passed through opening 13 on one side and a laser beam B2 that has been emitted from the laser welding machine 2B on the other side and passed through the opening 23 on the other side (hereinafter referred to as "step 2"). Hereinafter, a method for producing a part using the welding jig device 1 will be specifically described.

In step 1, the plurality of members W, which are the targets to be welded together, are held between the joint face 12 on one side of the jig 10 on one side and the joint face 22 on the other side of the jig 20 on the other side of the welding jig device 1. In step 1, the plate-like members W are fixed in place between the jig 10 on one side and the jig 20 on the other side with a fastening force exerted by both the right and left support portions 31 on one side and the right and left support portions 32 on the other side. The jig 10 on one side and the jig 20 on the other side are prevented from positional deviations in the right-left direction and the front-rear direction by the positioning pins 17 illustrated in FIG. 2 that engage the jig 10 on one side with the jig 20 on the other side. In addition, since the members W to be welded are fixed between the jig 10 on one side and the jig 20 on the other side in the welding jig device 1 by the jig 10 on one side and the jig 20 on the other side, strain of the members W due to heat during welding is suppressed. Therefore, according to the welding jig device 1, the part 5 can be formed by joining through high-quality welding.

As illustrated in FIG. 7, in step 2, the laser beam B1 is emitted from the laser welding machine 2A on one side provided above the welding jig device 1 that is holding the members W between the jig 10 on one side and the jig 20 on the other side. At this time, in the welding jig device 1, the lateral face 18 on one side, which is opposite to the joint face 12 on one side, of the jig 10 on one side faces the laser welding machine 2A on one side. Therefore, the laser beam B1 is transmitted through the opening 13 on one side of the jig 10 on one side in the scanning range LA1 of the aforementioned galvanometer mirror, and then irradiates a portion of the portions 53 to be welded of the members W that are held on the inner side of the joint face 12 on one side of the jig 10 on one side. The laser welding machine 2A on one side is configured to be movable on the xy plane along the faces of the members W within a predetermined movable region M1 by a drive mechanism (not illustrated). Therefore, the laser welding machine 2A on one side can irradiate the portions 53 to be welded, which correspond to the opening 13 on one side, provided across the entire members W with the laser beam B1.

In step 2, the laser beam B2 is also emitted from the laser welding machine 2B on the other side provided below the welding jig device 1 that is holding the members W between the jig 10 on one side and the jig 20 on the other side. At this time, in the welding jig device 1, the lateral face 28 on the other side, which is opposite to the joint face 22 on the other side, of the jig 20 on the other side faces the laser welding machine 2B on the other side. Therefore, the laser beam B2 is transmitted through the opening 23 on the other side of the jig 20 on the other side in the scanning range LA2 of the aforementioned galvanometer mirror, and then reaches the members W held on the inner side of the joint face 22 on the other side of the jig 20 on the other side. Specifically, the laser beam B2 irradiates another portion of the portions 53 to be welded of the members W that has not been welded by the laser beam B1 transmitted through the opening 13 on one side. The laser welding machine 2B on the other side is configured to be movable on the xy plane along the faces of the members W within a predetermined movable region M2 by a drive mechanism (not illustrated). Therefore, the laser welding machine 2B on the other side can irradiate the portions 53 to be welded, which correspond to the opening 23 on the other side, provided across the entire members W with the laser beam B2. Herein, the timing of emission of the laser beam B1 from the laser welding machine 2A on one side and the timing of emission of the laser beam B2 from the laser welding machine 2B on the other side may be either the same or different.

As described above, in the method for producing the part 5 using the welding jig device 1, step 2 is executed that includes welding a portion of the desired portions 53 to be welded with the laser beam B1 from the laser welding machine 2A on one side through the opening 13 on one side provided in the jig 10 on one side, and welding the remaining portion of the portions 53 to be welded with the laser beam B2 from the laser welding machine 2B on the other side through the opening 23 on the other side provided in the jig 20 on the other side. With the welding jig device 1, welding can be performed through both the opening 13 on one side and the opening 23 on the other side. Thus, the portions 53 to be welded with a complex shape can be welded together without the need for a jig replacement operation or the like.

Accordingly, for the part 5 to be produced with the welding jig device 1, it is possible to easily form the desired welded portions 53 with high precision by performing welding through both the opening 13 on one side and the opening 23 on the other side even when the portions 53 to be welded are located in proximity to each other or the shapes of the portions 53 to be welded are complex such as an annular closed path, for example. Specifically, for the part 5 to be produced with the welding jig device 1, it is possible to weld the portions 53 to be welded together through both the opening 13 on one side and the opening 23 on the other side while holding the portions 53 to be welded for the part 5 with the jig 10 on one side and the jig 20 on the other side such that the portions 53 to be welded are sufficiently tightly attached together. Thus, even the portions 53 to be welded with a complex shape can be welded together with high precision easily. In addition, for the part 5 to be produced with the welding jig device 1, the portions 53 to be welded are welded together, part by part, from the opposite sides (i.e., the face W11 and the face W21 illustrated in FIGS. 1 and 7) exposed on the outer surface sides of the members W. Thus, a high-quality part can be produced with the welding strain cancelled out.

In the welding jig device 1, the jig 10 on one side and the jig 20 on the other side respectively have the transmissive hole portions 15 and 25 and the transmissive portions 16 and 26. The transmissive hole portions 15 and 25 and the transmissive portions 16 and 26 are provided to allow the laser beams B1 and B2, which have been respectively emitted from the laser welding machine 2A on one side toward the opening 13 on one side and from the laser welding machine 2B on the other side toward the opening 23 on the other side, to be transmitted therethrough. Herein, since the welding jig device 1 has the transmissive hole portions 15 and 25 and the transmissive portions 16 and 26, even if the members W partially melt, the melted portions will fall inside the transmissive hole portions 15 and 25 and the transmissive portions 16 and 26. Therefore, according to the welding jig device 1, the partially melted members W can be prevented from sticking to the part 5, which would otherwise degrade the product quality.

Figure 8:
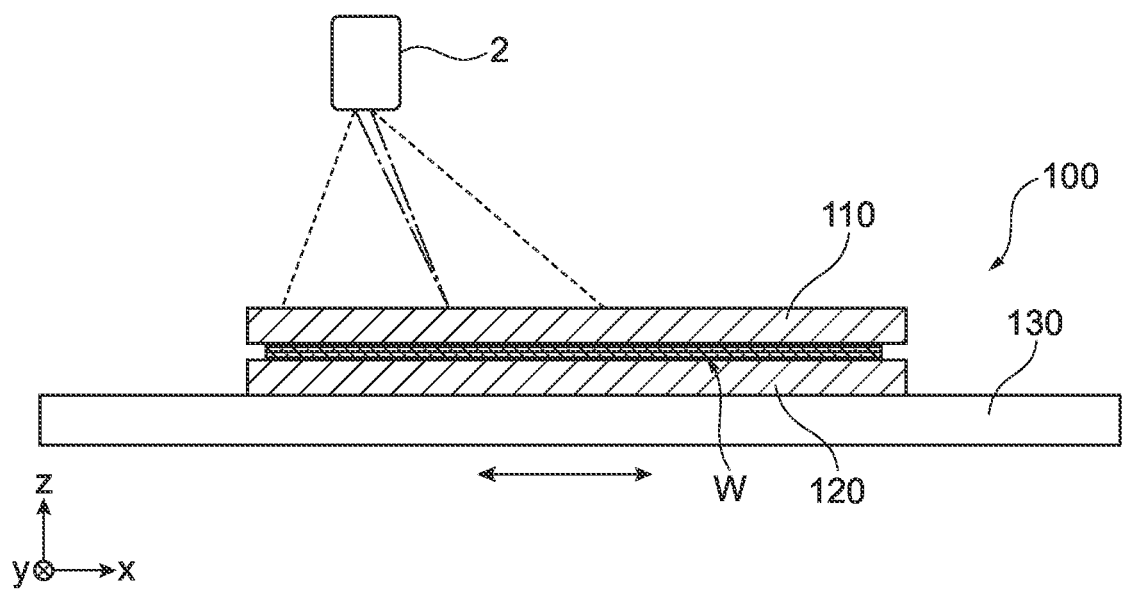
FIG. 8 A front view for illustrating the schematic configuration of a welding jig device as a reference example.
Figure 9:
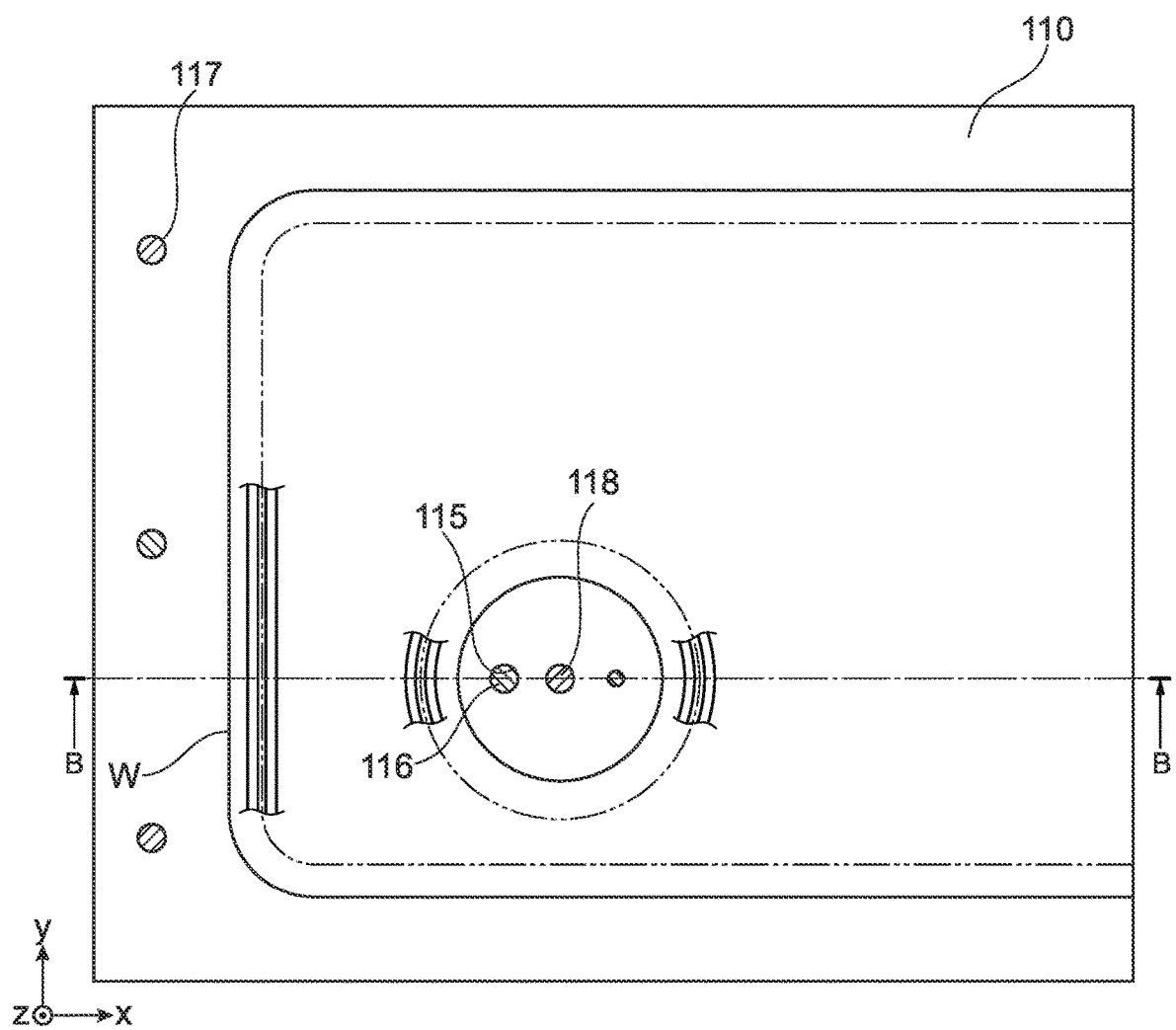
FIG. 9 A plan view for illustrating the schematic configuration of the welding jig device illustrated in FIG. 8.

FIG. 8 is a front view for illustrating the schematic configuration of a welding jig device 100 as a reference example. In addition, FIG. 9 is a plan view for illustrating the schematic configuration of the welding jig device 100. Further, FIG. 10 is a B-B cross-sectional view for illustrating the schematic configuration of the welding jig device 100.

Figure 10:
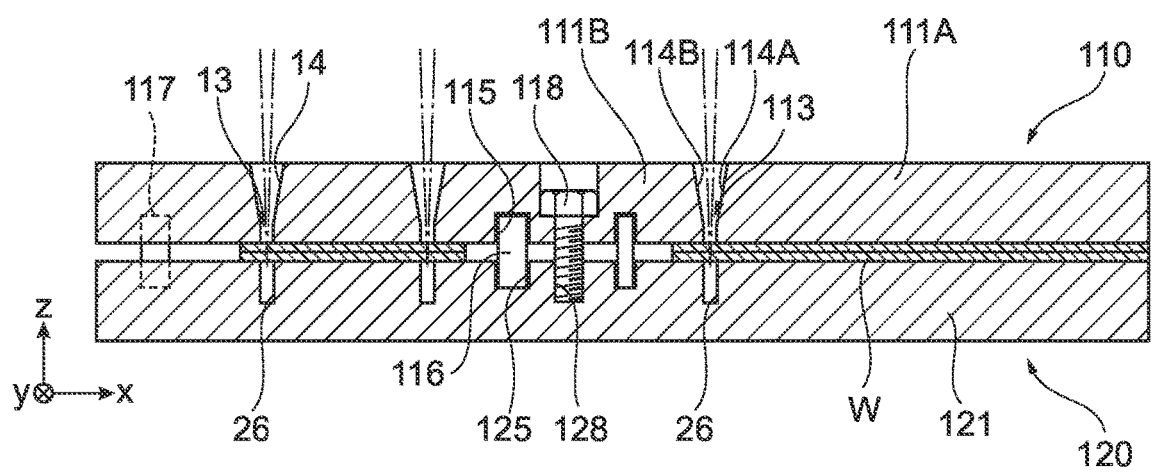
FIG. 10 A B-B cross-sectional view for illustrating the schematic configuration of the welding jig device illustrated in FIG. 8.

The welding jig device 100 illustrated as a reference example in FIGS. 8 to 10 is used for forming the part 5, such as a fuel cell, by welding a plurality of members W together as with the welding jig device 1. As illustrated in FIG. 10, the welding jig device 100 differs from the aforementioned welding jig device in that although a jig 110 on one side having a joint face 12 on one side faces a laser welding machine 2, a jig 120 on the other side has no opening and does not face the laser welding machine 2. That is, the welding jig device 100 is configured such that a laser beam is emitted only from above the jig 110 on one side.

In addition, as illustrated in FIGS. 9 and 10, to weld annular portions together with the welding jig device 100, the jig 110 on one side includes two members: a first jig body 111A and a second jig body 111B that has a second opening 113 corresponding to the annular portions to be welded, which do not correspond to the opening 13 on one side, among the desired welded portions 53 of the part 5. The jig 110 on one side, which has a combination of the first jig body 111A and the second jig body 111B, forms the second opening 113 as well as inclined planes 114A and 114B of the opening corresponding to the annular portions to be welded. The second jig body 111B and the jig 120 on the other side are fixed together by a combination of pin holes 115 and 125 and positioning pins 116 and a combination of a bolt 118 and a bolt hole 128.

In a welding operation performed with the welding jig device 100, the use of the jig 110 on one side, which includes the separate first jig body 111A and second jig body 111B, results in a long time for the operation of fixing the first jig body 111A and the second jig body 111B to the jig 120 on the other side. In addition, since the first jig body 111A and the second jig body 111B of the welding jig device 100 are separate members, it has been necessary to adequately position the first jig body 111A and the second jig body 111B with respect to the jig 120 on the other side. As described above, the welding jig device 100 requires a number of steps regarding the operation of fixing the jigs.

Meanwhile, in the welding jig device 1 according to the present embodiment, the jig 10 on one side and the jig 20 on the other side respectively have the opening 13 on one side and the opening 23 on the other side corresponding to the portions 53 to be welded. Therefore, according to the welding jig device 1, since the production of the part 5 only involves holding the plurality of members W between the jig 10 on one side and the jig 20 on the other side and welding the members W together through both the opening 13 on one side and the opening 23 on the other side, it is possible to reduce the number of steps regarding the operation of fixing the jigs and improve the precision of the welded portions along with the fixed positions of the jigs.

Although the embodiment of the present disclosure has been described above, the present disclosure is not limited to the welding jig device 1 according to the embodiment of the present disclosure described above or the method for producing the part 5 using the welding jig device 1, and includes various aspects encompassed by the concept of the present disclosure and the scope of the claims. In addition, the aforementioned configurations may be selectively combined as appropriate so as to achieve at least a part of the aforementioned object and effects. For example, the shape, material, arrangement, size, and the like of each configuration can be changed as appropriate depending on a specific usage pattern of the present disclosure. For example, the members W welded together with the welding jig device 1 may be members other than metal.

The invention claimed is:

1. A welding jig device used for forming a part by welding a plurality of members together, comprising:
    a first jig on one side including a joint face on the one side and an opening on the one side, the joint face on the one side being adapted to contact one of faces exposed on outer surface sides of the plurality of members that are overlaid one on top of the other, the opening on the one side corresponding to a portion of to-be-formed welded portions of the part;
    a second jig on another side including a joint face on the other side and an opening on the other side, the joint face on the other side being adapted to contact another face of the faces exposed on the outer surface sides of the plurality of members, the opening on the other side corresponding to another portion of the to-be-formed welded portions of the part and not corresponding to the opening on the one side;
    a first laser welding machine on the one side that is configured to emit a laser beam toward the opening on the one side; and
    a second laser welding machine on the other side that is configured to emit a laser beam toward the opening on the other side,
    wherein the to-be-formed welded portions that are formed through the opening on the one side and the opening on the other side form annular closed paths.

2. The welding jig device according to claim 1, wherein:
    the first laser welding machine on the one side is provided on an outer side of a lateral face on the one side, the lateral face on the one side being opposite to the joint face on the one side, and the second laser welding machine on the other side is provided on an outer side of a lateral face on the other side, the lateral face on the other side being opposite to the joint face on the other side.

3. A method for producing a part by overlaying a plurality of members one on top of the other and welding the members together, comprising:

overlaying the plurality of members one on top of the other and holding the members with a first jig on one side and a second jig on another side, the first jig on the one side including a joint face on the one side and an opening on the one side, the joint face on the one side being adapted to contact one of faces exposed on outer surface sides of the plurality of members overlaid one on top of the other, the opening on the one side corresponding to a portion of to-be-formed welded portions of the part, the second jig on the other side including a joint face on the other side and an opening on the other side, the joint face on the other side being adapted to contact another face of the faces exposed on the outer surface sides of the plurality of members, the opening on the other side corresponding to another portion of the to-be-formed welded portions of the part and not corresponding to the opening on the one side; and welding the plurality of members together through the opening on the one side and the opening on the other side, wherein:

the welding the plurality of members together through the opening on the one side and the opening on the other side includes emitting a laser beam from a first laser welding machine on the one side toward the opening on the one side, and emitting a laser beam from a second laser welding machine on the other side toward the opening on the other side, the first laser welding machine on the one side being provided on an outer side of a lateral face on the one side of the first jig on the one side, the second laser welding machine on the other side being provided on an outer side of a lateral face on the other side of the second jig on the other side, and the to-be-formed welded portions that are formed through the opening on the one side and the opening on the other side form annular closed paths.

\* \* \* \* \*